(12) United States Patent
Chau et al.

(10) Patent No.: US 10,643,667 B2
(45) Date of Patent: May 5, 2020

(54) BOUNDING BOX DOUBLING AS REDACTION BOUNDARY

(71) Applicant: Avigilon Corporation, Vancouver (CA)

(72) Inventors: Alexander Chau, Coquitlam (CA); Christian Lemay, Surrey (CA)

(73) Assignee: AVIGILON CORPORATION, Vancouver, British Columbia ( * ) Notice: Subject to any disclaimer, the term of this patent is extended or adjusted under 35 U.S.C. 154(b) by 0 days.

(21) Appl. No.: 16/453,916

(22) Filed: Jun. 26, 2019

(65) Prior Publication Data

US 2020/0082851 A1 Mar. 12, 2020

Related U.S. Application Data

(60) Provisional application No. 62/729,920, filed on Sep. 11, 2018.

(51) Int. Cl.
*H04N 5/77* (2006.01)
*G11B 27/34* (2006.01)
*G06K 9/00* (2006.01)
*H04N 5/93* (2006.01)

(52) U.S. Cl.
CPC .......... *G11B 27/34* (2013.01); *G06K 9/00228* (2013.01); *G06K 9/00718* (2013.01); *G06K 9/00771* (2013.01); *G06K 2209/15* (2013.01)

(58) Field of Classification Search
CPC ............... G11B 27/34; G06K 9/00718; G06K 9/00228; G06K 9/00771; G06K 2209/15

USPC ................ 386/278, 224, 226, 248, 281, 284
See application file for complete search history.

(56) References Cited

U.S. PATENT DOCUMENTS

| 9,465,997 B2* | 10/2016 | Tu ..................... G06K 9/00771 |
| 9,781,391 B2 | 10/2017 | Yamagi |
| 2015/0201198 A1 | 7/2015 | Marlatt et al. |
| 2017/0004384 A1 | 1/2017 | Audo et al. |
| 2017/0220816 A1 | 8/2017 | Matusek et al. |
| 2018/0157939 A1 | 6/2018 | Butt et al. |
| 2018/0268240 A1* | 9/2018 | Loce ................. G06K 9/00228 |
| 2019/0253747 A1* | 8/2019 | Ramaswamy ..... G06K 9/00744 |

FOREIGN PATENT DOCUMENTS

| GB | 2426136 A | 11/2006 |
| KR | WO2018088608 A1 | 5/2018 |
| WO | WO2018068146 A1 | 4/2018 |

OTHER PUBLICATIONS

Ryoo et al., "Privacy-Preserving Human Activity Recognition from Extreme Low Resolution", Proceedings of the Thirty-First AAAI Conference on Artificial Intelligence (AAAAI-17), 2017, pp. 4255 to 4262.

Miyazaki et al., "Privacy-Conscious Human Detectien Using Low-Resolution Video", 2015 3rd IAPR Asian Conference on Pattern Recognition, 2015, pp. 326 to 330.

* cited by examiner

*Primary Examiner* — Robert Chevalier
(74) *Attorney, Agent, or Firm* — Daniel Hammond

(57) ABSTRACT

Methods, systems, and techniques for redacted video exports are disclosed. Consistent with example embodiments, a bounding box may double as a redaction boundary.

20 Claims, 12 Drawing Sheets

FIG. 3

Search:

| Title | Start Time |
|---|---|
| Elaine | Mon, Aug 28, 2017 12:00:50 PM |
| EmptyResults | Mon, Aug 14, 2017 5:10:27 PM |
| Face thumbnail not loading | Wed, Jun 28, 2017 5:41:57 PM |
| Face works, expenad confidence | Wed, Jun 28, 2017 5:42:12 PM |
| FaceDetection | Thu, Aug 24, 2017 9:38:59 AM |
| FaceDetection2 | Thu, Aug 24, 2017 9:49:04 AM |
| Find Before, Zero Results | Wed, Jul 05, 2017 12:17:41 PM |
| Ghost bookmark issue | Thu, Aug 10, 2017 12:19:23 PM |
| Good Face match different shirt | Thu, Aug 24, 2017 1:09:05 PM |
| green thumbnail | Thu, Aug 24, 2017 3:03:08 PM |
| Juan Face – body | Wed, Aug 09, 2017 10:35:59 AM |
| MissingMainTimeline | Tue, Aug 29, 2017 11:52:52 PM |
| New Bookmark | Tue, Aug 01, 2017 10:34:01 AM |
| Object Behind Tree | Thu, Jul 27, 2017 1:58:40 PM |

↳ Find Appearance After This
  searches all cameras for this person after this point ↰ Find Appearance Before This
  searches all cameras for this person before this point 🔍 Additional Search Options Bookmark
Name: Good Face match different shirt
Start: Thu, Aug 24, 2017 1:09:05 PM
End: Thu, Aug 24, 2017 1:09:58 PM
Duration: 0 hours, 0 minutes, 53 seconds
Created By: administrator
Camera(s): ASFB [ASSET-2639] 5.0L-H4A-B3
Created On: Thu, Aug 24, 2017 3:21:34 PM
Description:

Export this event
Perform a motion search on this event
Edit this bookmark
Export results to a file 1 Bookmark Selected 1:09:05 PM
Thursday, August 24, 2017

BOUNDING BOX DOUBLING AS REDACTION BOUNDARY

RELATED U.S. APPLICATION DATA

The present application claims the benefit of priority of provisional application No. 62/729,920 filed on Sep. 11, 2018, the contents of which are hereby incorporated by reference in its entirety.

TECHNICAL FIELD

The present disclosure is directed at a method, system and computer program product for carrying out redaction of surveillance video.

BACKGROUND

Intelligent processing and playback of recorded surveillance video is often an important function for inclusion in a physical surveillance system. For example, a physical surveillance system may include many cameras, each of which records surveillance video. The total amount of surveillance video recorded by those cameras, much of which is typically recorded concurrently, makes relying upon manual location and tracking of a person-of-interest who appears in the recorded surveillance video inefficient. Intelligent processing and playback of surveillance video, and in particular automated search functionality, may accordingly be used to increase the efficiency with which a person-of-interest can be identified using a physical surveillance system.

Masking can be used to obscure certain video image details (for example, portions of video image frames in a video image stream). One or more objects can form a part of the portions of a video to be obscured. For example, security footage may include private information (such as, for example, license plates and faces) that need to be obscured to allow publishing or dissemination in a manner that would otherwise violate privacy. When footage is used in a public manner, one has to consider whether there is some legal or other requirement to obscure people's faces, address markers, or other objects, for privacy concerns.

SUMMARY

According to one example embodiment, there is provided a method that includes persistently storing surveillance video in an unredacted format within a system. The method also includes accessing, from within the system, the surveillance video and metadata defining a plurality of moving bounding boxes that: designate a respective plurality of identified foreground objects within the surveillance video; and follow movement thereof. The method also includes generating, from the surveillance video, at least one redacted video clip formatted to include at least a subset of the moving bounding boxes. The subset of the moving bounding boxes overlay video image frames of the redacted video clip. Each bounding box of the subset delineates a boundary inside of which a revealed object area and outside of which an outside area appear in the redacted video clip as an unredacted part and a redacted part respectively.

According to another example embodiment, there is provided an apparatus that includes a display, an input device and at least one processor communicatively coupled to the display and the input device. The apparatus also includes a memory communicatively coupled to the processor and having stored thereon computer program code that is executable by the processor, wherein the computer program code, when executed by the processor, causes the processor to perform a method. The method includes retrieving, via a request to a server, surveillance video and metadata defining a plurality of moving bounding boxes that: designate a respective plurality of identified foreground objects within the surveillance video; and follow movement thereof. The method also includes generating, from the surveillance video, at least one redacted video clip formatted to include at least a subset of the moving bounding boxes. The subset of the moving bounding boxes overlay video image frames of the redacted video clip. Each bounding box of the subset delineate a boundary inside of which a revealed object area and outside of which an outside area appear in the redacted video clip as an unredacted part and a redacted part respectively.

According to yet another example embodiment, there is provided a tangible, non-transitory, computer-readable storage medium having instructions encoded therein. The instructions, when executed by at least one processor, causes a carrying out of a method including retrieving, via a request to a server, surveillance video and metadata defining a plurality of moving bounding boxes that: designate a respective plurality of identified foreground objects within the surveillance video; and follow movement thereof. The method also includes generating, from the surveillance video, at least one redacted video clip formatted to include at least a subset of the moving bounding boxes. The subset of the moving bounding boxes overlay video image frames of the redacted video clip. Each bounding box of the subset delineates a boundary inside of which a revealed object area and outside of which an outside area appear in the redacted video clip as an unredacted part and a redacted part respectively.

According to another aspect, there is provided a non-transitory computer readable medium having stored thereon computer program code that is executable by a processor and that, when executed by the processor, causes the processor to perform the method of any of the foregoing aspects or suitable combinations thereof.

BRIEF DESCRIPTION OF THE DRAWINGS

Reference will now be made, by way of example, to the accompanying drawings:

FIG. 3 shows a user interface page including an image frame of a video recording that permits a user to commence a search for a person-of-interest, according to an example embodiment implemented using the client-side video review application of FIG. 2.

FIG. 6 shows, in a first state before a user defines video export details, a user interface page for defining and generating a video export.

FIG. 7 shows the user interface page of FIG. 6 in a second state where definition by the user of export details has been completed, but generation of a redacted video file has not yet commenced.

FIG. 9 shows the user interface page of FIG. 6 in a fourth state where 100% of the redacted video file generation is complete.

Similar or the same reference numerals may have been used in different figures to denote similar example features illustrated in the drawings.

DETAILED DESCRIPTION OF EXAMPLE EMBODIMENTS

Figure 1:
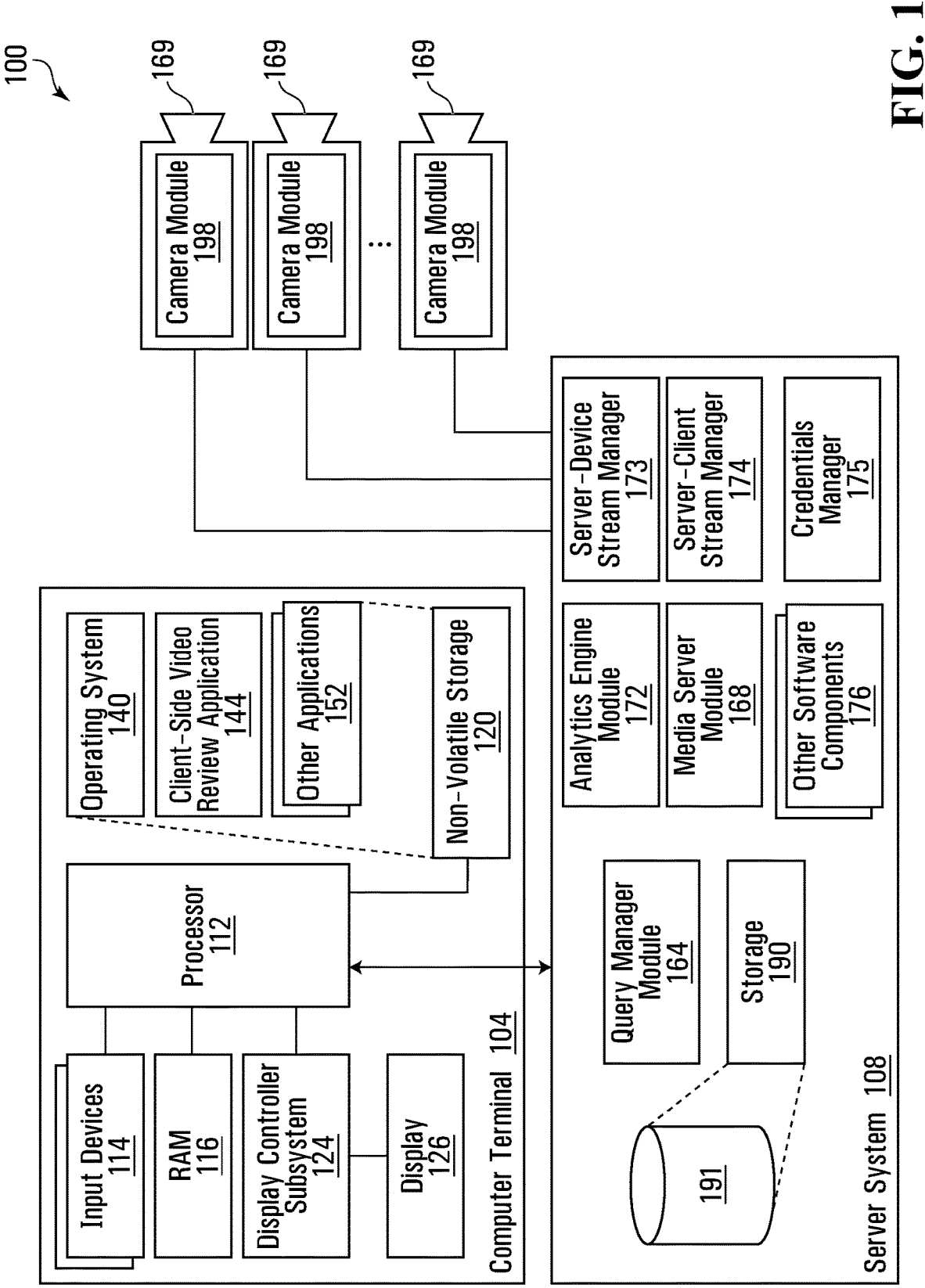
FIG. 1 shows a block diagram of an example surveillance system within which methods in accordance with example embodiments can be carried out.

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction executing system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to various embodiments. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

This disclosure describes various example embodiments. It is contemplated that, to the extent that a person skilled in the art would understand it to be feasible, any part of any example embodiment described herein may be implemented or combined with any part of any other example embodiment described herein.

The term "object" as used herein is understood have the same meaning as would normally be given by one skilled in the art of video analytics, and examples of objects may include humans (full body), humans (face only), vehicles, animals, etc.

Reference is now made to FIG. 1 which shows a block diagram of an example surveillance system 100 within which methods in accordance with example embodiments can be carried out. Included within the illustrated surveillance system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems [not shown]. The display controller subsystem 124 interacts with display 126 and it renders graphics and/or text upon the display 126.

Still with reference to the computer terminal 104 of the surveillance system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
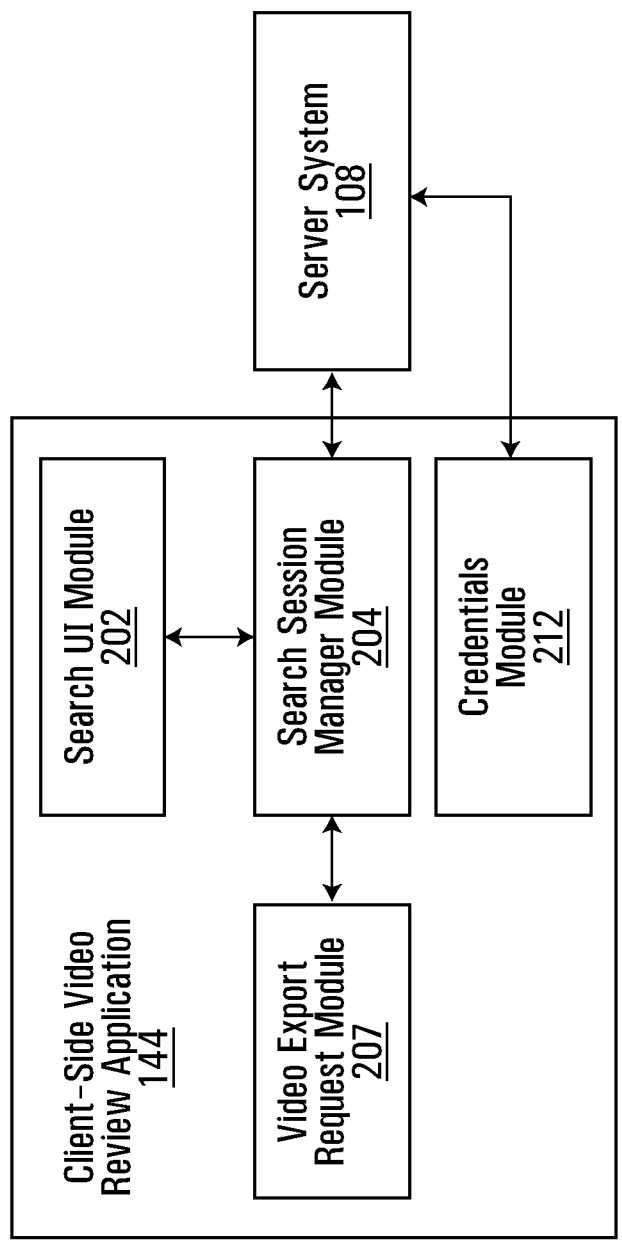
FIG. 2 shows a block diagram of a client-side video review application, in accordance with certain example embodiments, that can be provided within the example surveillance system of FIG. 1.

More details of the video review application 144 are shown in the block diagram of FIG. 2. The video review application 144 can be run on the computer terminal 104 and includes a search User Interface (UI) module 202 for cooperation with a search session manager module 204 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation the video recordings.

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs). The query manager module 164 receives and processes queries originating from the computer terminal 104, which may facilitate retrieval and delivery of specifically defined video data and metadata in support of client-side video review, export, redaction, etc.

Still with reference to FIG. 2, the video review application 144 also includes a video export module 207. The video export module 207 is configured to cooperate with the search session manager module 204 in order to enable a computer terminal user to carry out actions related to the export and redaction of surveillance video. This will be later herein described in more detail in connection with FIGS. 6-11 and the parts of the present detailed description relating thereto.

The video review application 144 also includes a credentials module 212. The credentials module 212 is configured to furnish inputted user credentials to a credentials manager 175 (subsequently herein described) in order that the credentials of a prospective user of the surveillance system 100 may be verified.

Referring once again to FIG. 1, the server system 108 includes several software components (besides the query manager module 164 already described) for carrying out other functions of the server system 108. For example, the server system 108 includes a media server module 168 (FIG. 1). The media server module 168 handles client requests related to storage and retrieval of surveillance video taken by video cameras 169 in the surveillance system 100. The server system 108 also includes an analytics engine module 172. The analytics engine module 172 can, in some examples, be any suitable one of known commercially available software that carry out mathematical calculations (and other operations) to attempt computerized matching of same individuals or objects as between different portions of surveillance video recordings (or as between any reference image and surveillance video compared to the reference image). For example, the analytics engine module 172 can, in one specific example, be a software component of the Avigilon Control Center™ server software sold by Avigilon Corporation. In another example, the analytics engine module 172 can be a software component of some other commercially available Video Management Software (VMS) that provides similar video analytics functionality. The analytics engine module 172 can, in some examples, use the descriptive characteristics of the person's or object's appearance. Examples of these characteristics include the person's or object's shape, size, textures and color.

The server system 108 also includes a server-device stream manager 173 and a server-client stream manager 174. The server-device stream manager 173 is configured to control the streaming of surveillance video from any one or more of the video cameras 169 to the server system 108. As will be appreciated by those skilled in the art, the server-device stream manager 173 can carry out video processing (for example, video de-multiplexing) to facilitate storing of surveillance video in the storage 190 or passing the streamed surveillance video to the server-client stream manager 174 for further processing. Regarding the server-client stream manager 174, just as the server-device stream manager 173 is configured to control the streaming of surveillance video from the video cameras 169 to the server system 108, so too the server-client stream manager 174 provides a complimentary function as between the server system 108 and the computer terminal 104. Some further example details of the server-device stream manager 173 and the server-client stream manager 174 may be found in commonly owned US Pat. Publ. No 2015/0201198.

Still with reference to FIG. 1, the server system 108 also includes a credentials manager 175. The credentials manager 175 controls user authentication and permission settings within the surveillance system 100. As will be subsequently herein described in more detail, the credentials manager 175 may, in accordance with some example embodiments, permit certain recognized users to only be allowed to stream non-high definition surveillance video to their computer screens and, by contrast, permit certain different recognized users the ability to stream all different qualities of surveillance video to their computer screens.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The server system 108 also includes one or more data stores 190. In some examples, the data store 190 comprises one or more databases 191 which facilitate the organized storing of recorded surveillance video, including surveillance video to be exported in redacted and/or otherwise modified form in accordance with example embodiments.

Regarding the video cameras 169, each of these includes a camera module 198. In some examples, the camera module 198 includes one or more specialized integrated circuit chips to facilitate processing and encoding of surveillance video before it is even received by the server system 108. For instance, the specialized integrated circuit chip may be a System-on-Chip (SoC) solution including both an encoder and a Central Processing Unit (CPU). These permit the camera module 198 to carry out the processing and encoding functions. Also, in some examples, part of the processing functions of the camera module 198 includes creating metadata for recorded surveillance video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule may be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle or animal) based upon a single instance of the object. The input to the instantaneous object classification submodule may optionally be a sub-region of an image in which the visual object of interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a bicycler. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

In some examples, the camera module 198 is able to detect humans and extract images of humans with respective bounding boxes outlining the human objects (for example, human full body, human face, etc.) for inclusion in metadata which along with the associated surveillance video may transmitted to the server system 108. At the system 108, the media server module 168 can process extracted images and generate signatures (e.g. feature vectors) to represent objects. In computer vision, a feature descriptor is generally known as an algorithm that takes an image and outputs feature descriptions or feature vectors. Feature descriptors encode information, i.e. an image, into a series of numbers to act as a numerical "fingerprint" that can be used to differentiate one feature from another. Ideally this information is invariant under image transformation so that the features may be found again in another image of the same object. Examples of feature descriptor algorithms are SIFT (Scale-invariant feature transform), HOG (histogram of oriented gradients), and SURF (Speeded Up Robust Features).

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

Similarity calculation can be just an extension of the above. Specifically, by calculating the Euclidean distance between two feature vectors of two images captured by one or more of the cameras 169, a computer implementable process can determine a similarity score to indicate how similar the two images may be.

In accordance with at least some examples, storage of feature vectors within the surveillance system 100 is contemplated. For instance, feature vectors may be indexed and stored in the database 191 with respective video. The feature vectors may also be associated with reference coordinates to where extracted images of respective objects are located in respective video. Storing may include storing surveillance video with, for example, time stamps, camera identifications, metadata with the feature vectors and reference coordinates, etc.

Figure 4:
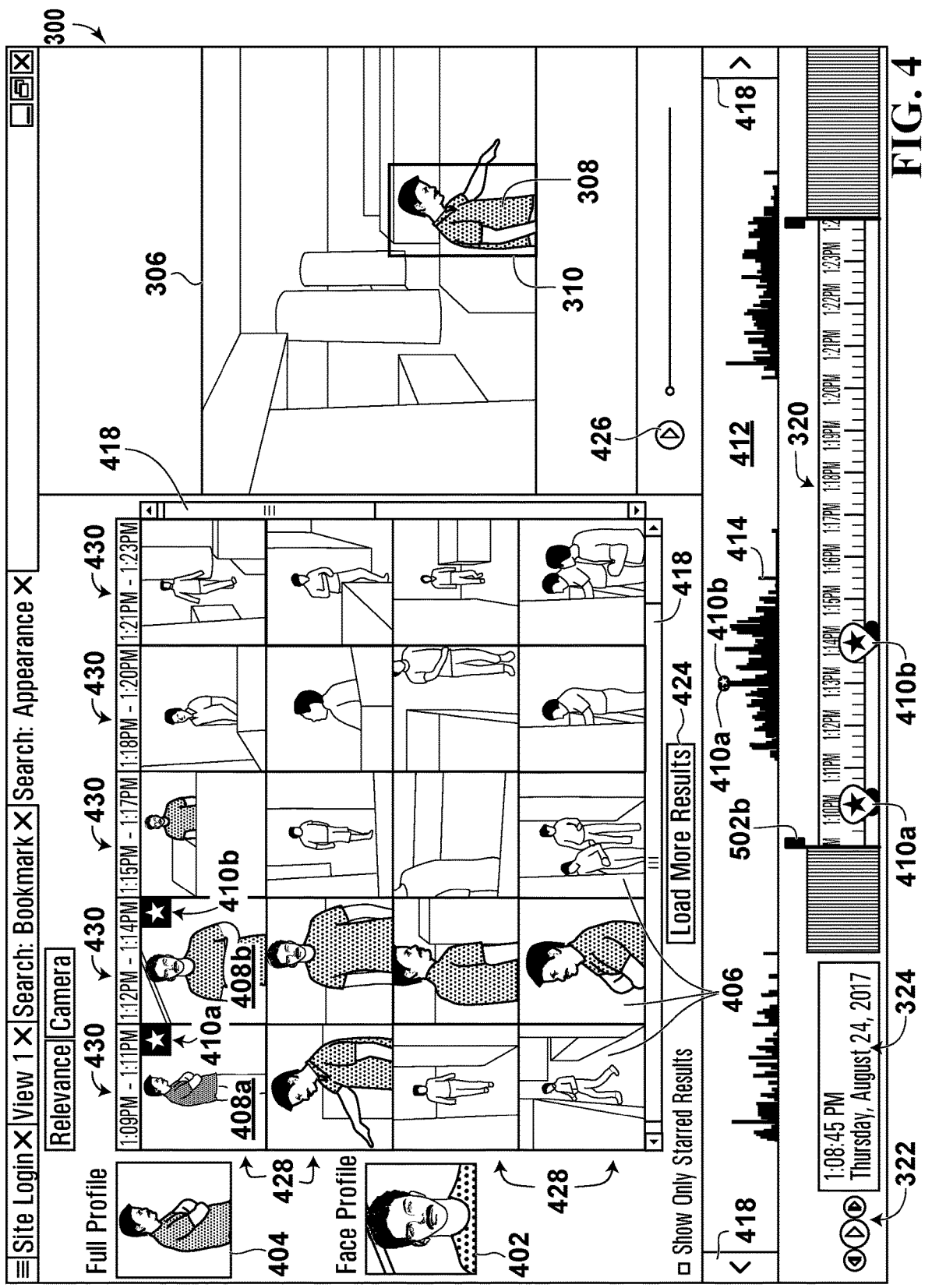
FIG. 4 shows a user interface page including image search results, with the image search results having been generated after a search for the person-of-interest has commenced and before a user has provided match confirmation user input, according to an example embodiment implemented using the client-side video review application of FIG. 2.
Figure 5:
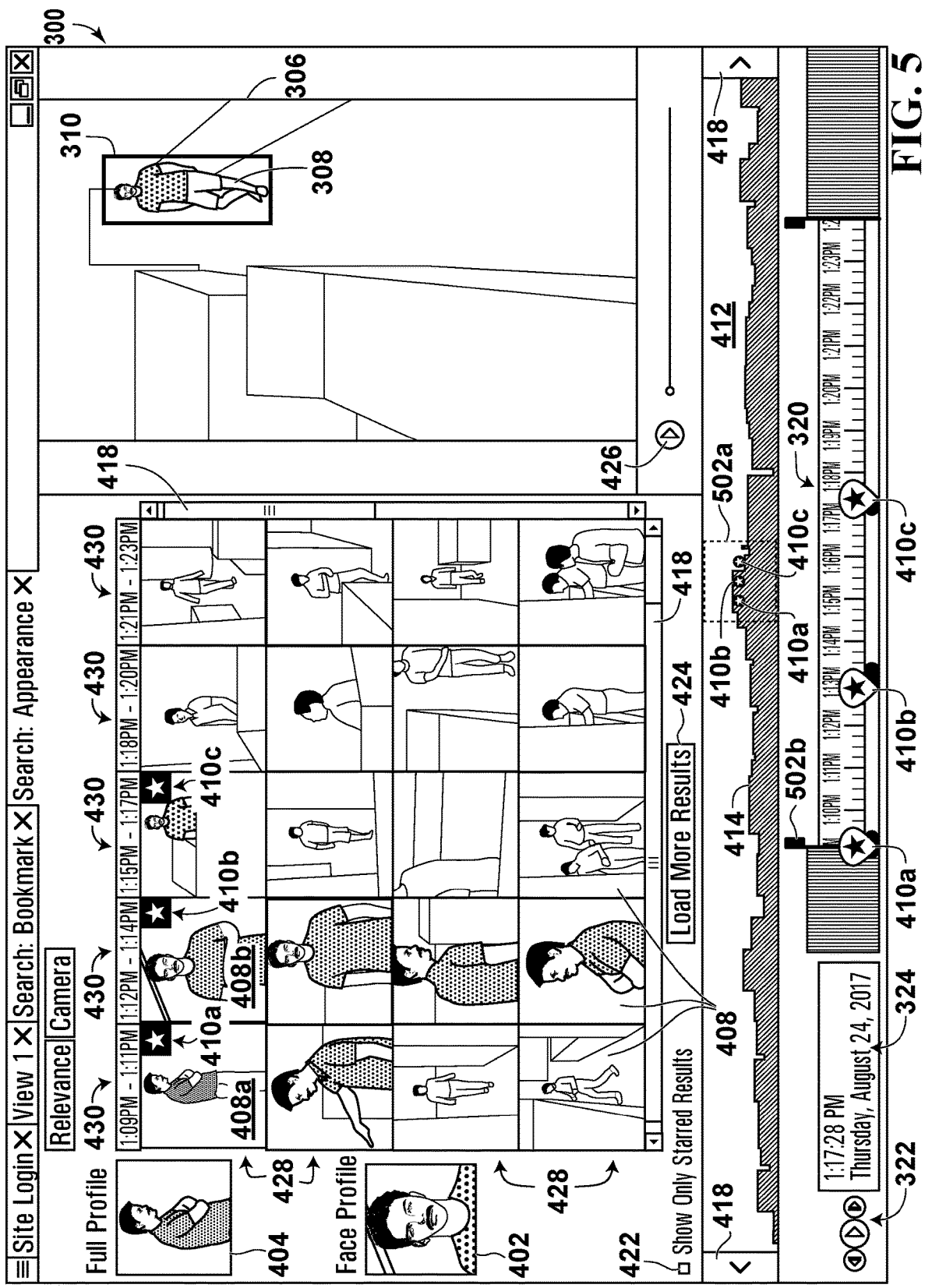
FIG. 5 shows a user interface page including image search results, with the image search results having been generated after a user has provided match confirmation user input, according to an example embodiment implemented using the client-side video review application of FIG. 2.

Referring now to FIGS. 3 to 5, there are shown various user interface pages that the search UI module 202 displays to a user of the client-side video review application 144, according to one example embodiment. The embodiment depicted in FIGS. 2 to 5 permits the application's 144 user to commence a search for a person-of-interest and to have a face thumbnail and a body thumbnail of the person-of-interest displayed to assist the user in identifying the person-of-interest while reviewing image search results. As used herein, a "person-of-interest" is a person that the application's 144 user is attempting to locate using the surveillance system 100. The server system 108 in the embodiment of FIGS. 2 to 5 is able to search any one or more of a collection of surveillance video recordings using any one or more of the cameras 169 based on one or both of the person-of-interest's body and face; the collection of surveillance video recordings may or may not be generated concurrently by the cameras 169. Permitting the body and face to be used during searching accordingly may help both the server system 108 and the user identify the person-of-interest, particularly when the person-of-interest's body changes appearance in different recordings or at different times (e.g., resulting from the person-of-interest changing clothes).

While not illustrated in FIGS. 3 to 5, it is contemplated that searches can also be run based on facets believed to be possessed by the person-of-interest, and this type of searching can be done either in combination with or in alternative to the type of search shown in FIGS. 3 to 5. With facets-based searching the user may manipulate GUI widgets (such as, for example, selectors, check boxes, etc.) and/or enter text in text boxes to allow the application 144 to build a search query suitable to be received and processed by the server system 108.

Referring now to FIG. 3 in particular, there is shown a user interface page 300 including an image frame 306 of a selected video recording that permits a user of the application 144 to commence a search for a person-of-interest 308. The selected video recording shown in FIG. 3 is one of the collection of surveillance video recordings obtained using different cameras 169 to which the user has access via the application 144. The application 144 displays the page 300 on the terminal's 104 display 126. The user provides input to the application 144 via the input device 114, which may be a mouse, a touch pad or other suitable input device. In FIG. 3, displaying the image frame 306 comprises the application 144 displaying the image frame 306 as a still image, although in different embodiments displaying the image frame 306 may comprise playing the selected surveillance video recording or playing the selected surveillance video recording.

The image frame 306 depicts a scene in which multiple persons are present. The server system 108 automatically identifies persons appearing in the scene that may be the subject of a search, and thus who are potential persons-of-interest 308 to the user, and highlights each of those persons by enclosing all or part of each in a bounding box 310. In FIG. 3, the user identifies the person located in the lowest bounding box 310 as the person-of-interest 308, and selects the bounding box 310 around that person to evoke a context menu 312 that may be used to commence a search. The context menu 312 presents the user with one option to search the collection of surveillance video recordings at all times after the image frame 306 for the person-of-interest 308, and another option to search the collection of surveillance video recordings at all times before the image frame 306. The user may select either of those options to have the server system 108 commence searching for the person-of-interest 308. The input the user provides to the server system 108 via the application 144 to commence a search for the person-of-interest is the "search commencement user input".

In FIG. 3, the user has bookmarked the image frame 306 according to which of the cameras 169 obtained it and its time index so as to permit the user to revisit that image frame 306 conveniently. Immediately below the image frame 306 is bookmark metadata 314 providing selected metadata for the selected surveillance video recording, such as its name and duration. To the right of the bookmark metadata 314 and below the image frame 306 are action buttons 316 that allow the user to perform certain actions on the selected surveillance video recording, such as to export the surveillance video recording and to perform a motion search on the recording.

Immediately to the left of the image frame 306 is a bookmark list 302 showing all of the user's bookmarks, with a selected bookmark 304 corresponding to the image frame 306. Immediately below the bookmark list 302 are bookmark options 318 permitting the user to perform actions such as to lock or unlock any one or more of the bookmarks to prevent them from being or to permit them to be changed, to export any one or more of the bookmarks, and to delete any one or more of the bookmarks.

Bordering a bottom-left edge of the page 300 are video control buttons 322 permitting the user to play, pause, fast forward, and rewind the selected surveillance video recording. Immediately to the right of the video control buttons 322 is a video time indicator 324, displaying the date and time corresponding to the image frame 306. Extending along a majority of the bottom edge of the page 300 is a timeline 320 permitting the user to scrub through the selected surveillance video recording and through the surveillance video collectively represented by the collection of surveillance video recordings. As discussed in further detail below in respect of FIGS. 8A and 8B, the timeline 320 is resizable in a manner that is coordinated with other features on the page 300 to facilitate searching.

Referring now to FIG. 4, the user interface page 300 is shown after the server system 108 has completed a search for the person-of-interest 308. The page 300 concurrently displays the image frame 306 of the selected surveillance video recording the user used to commence the search bordering a right edge of the page 300; immediately to the left of the image frame 306, image search results 406 selected from the collection of surveillance video recordings by the server system 108 as potentially corresponding to the person-of-interest 108; and, immediately to the left of the image search results 406 and bordering a left edge of the page 300, a face thumbnail 402 and a body thumbnail 404 of the person-of-interest 308.

While surveillance video is being recorded, at least one of the cameras 169 and server system 108 in real-time identify when people, each of whom is a potential person-of-interest 308, are being recorded and, for those people, attempt to identify each of their faces. The server system 108 generates signatures based on the faces (when identified) and bodies of the people who are identified, as described above. The server system 108 stores information on whether faces were identified and the signatures as metadata together with the surveillance video recordings.

In response to the search commencement user input the user provides using the context menu 312 of FIG. 3, the server system 108 generates the image search results 406 by searching the collection of surveillance video recordings for the person-of-interest 308. The server system 108 performs a combined search that includes a body search and a face search on the collection of surveillance video recordings using the metadata recorded for the person-of-interest's 308 body and face, respectively. More specifically, the server system 108 compares the body and face signatures of the person-of-interest 308 that the user indicates he or she wishes to perform a search on, to the body and face signatures, respectively, for other people that the system 108 has identified. The server system 108 returns the search results 406, which includes a combination of the results of the body and face searches, which the application 144 uses to generate the page 300. Any suitable method may be used to perform the body and face searches; for example, the server system 108 may use a Convolutional Neural Network (CNN) when performing the body search.

In one example embodiment, the face search is done by searching the collection of surveillance video recordings for faces. Once a face is identified, the coordinates of a bounding box (noting, as eluded to before, that there is no requirement in video analytics that bounding boxes be restricted in their function to just outlining a full human body) that bounds the face (e.g., in terms of an (x,y) coordinate identifying one corner of the box, and width and height of the box) and an estimation of the head pose (e.g., in terms of yaw, pitch, and roll) are generated. A feature vector may be generated that characterizes those faces using any one or more metrics. For example, for each face, any one or more of distance between the corners of eyes, distance between the centers of eyes, nose width, depth of eye sockets, shape of cheekbones, shape of jaw line, shape of chin, hair color, and the presence and color of facial hair may be used as metrics. Once the feature vectors are generated for the faces, the Euclidean distance between vectors for different faces may be determined and used to assess face similarity.

In at least one example embodiment, the cameras 169 generate the metadata and associated feature vectors in or nearly in real-time, and the server system 108 subsequently assesses face similarity using those feature vectors. However, in at least one alternative example embodiment the functionality performed by the cameras 169 and server system 108 may be different. For example, functionality may be divided between the server system 108 and cameras 169 in a manner different than as described above. Alternatively, one of the server system 108 and the cameras 169 may generate the feature vectors and assess face similarity.

In FIG. 3, the application 144 uses as the body thumbnail 404 at least a portion of the image frame 306 that is contained within the bounding box 310 highlighting the person-of-interest. The application 144 uses as the face thumbnail 402 at least a portion of one of the face search results that satisfy a minimum likelihood that that result correspond to the person-of-interest's 308 face; in one example embodiment, the face thumbnail 402 is drawn from the result of the face search that is most likely to correspond to the person-of-interest's 308 face. Additionally or alternatively, the result used as the basis for the face thumbnail 402 is one of the body search results that satisfies a minimum likelihood that the result correspond to the person-of-interest's 308 body. In another example embodiment, the face thumbnail 402 may be selected as at least a portion of the image frame 306 that is contained within the bounding box 310 highlighting the person-of-interest 308 in FIG. 3.

In FIG. 4, the image search results 406 comprise multiple images arranged in an array comprising n rows 428 and m columns 430, with n=1 corresponding to the array's topmost row 428 and m=1 corresponding to the array's leftmost column 430. The results 406 are positioned in a window along the right and bottom edges of which extend scroll bars 418 that permit the user to scroll through the array. In FIG. 4, the array comprises at least 4×5 images, as that is the portion of the array that is visible without any scrolling using the scroll bars 418.

Each of the columns 430 of the image search results 406 corresponds to a different time period of the collection of surveillance video recordings. In the example of FIG. 4, each of the columns 430 corresponds to a three minute duration, with the leftmost column 430 representing search results 406 from 1:09 p.m. to 1:11 p.m., inclusively, the rightmost column 430 representing search results 406 from 1:21 p.m. to 1:23 p.m., inclusively, and the middle three columns 430 representing search results 406 from 1:12 p.m. to 1:20 p.m., inclusively.

In the depicted embodiment, all of the search results 406 satisfy a minimum likelihood that they correspond to the person-of-interest 308; for example, in certain embodiments the application 144 only displays search results 406 that have at least a 25% likelihood ("match likelihood threshold") of corresponding to the person-of-interest 308. However, in certain other embodiments, the application 144 may use a non-zero match likelihood threshold that is other than 25%, or may display search results 406 in a manner not specifically based on a match likelihood threshold.

In FIG. 4, the body and face thumbnails 404,402 include at least a portion of a first image 408a and a second image 408b, respectively, which include part of the image search results 406. The first and second images 408a,b, and accordingly the body and face thumbnails 404,402, are different in FIG. 4; however, in different embodiments (not depicted), the thumbnails 404,402 may be based on the same image. Overlaid on the first and second images 408a,b are a first and a second indicator 410a,b, respectively, indicating that the first and second images are the bases for the body and face thumbnails 404,402. In FIG. 4 the first and second indicators 410a,b are identical stars, although in different embodiments (not depicted) the indicators 410a,b may be different.

Located immediately below the image frame 306 of the selected surveillance video recording are play/pause controls 426 that allow the user to play and pause the selected surveillance video recording. Located immediately below the horizontal scroll bar 418 beneath the image search results 406 is a load more results button 424, which permits the user to prompt the application 144 for additional tranches of search results 406. For example, in one embodiment, the application 144 may initially deliver at most a certain number of results 406 even if additional results 406 exceed the match likelihood threshold. In that example, the user may request another tranche of results 406 that exceed the match likelihood threshold by selecting the load more results button 424. In certain other embodiments, the application 144 may be configured to display additional results 406 in response to the user's selecting the button 424 even if those additional results 406 are below the match likelihood threshold.

Spanning the width of the page 300 and located below the thumbnails 402,404, search results 406, and image frame 306 is an appearance likelihood plot for the person-of-interest 308 in the form of a bar graph 412. The bar graph 412 depicts the likelihood that the person-of-interest 308 appears in the collection of surveillance video recordings over a given time span. In FIG. 4, the time span is divided into time periods of one day, and the entire time span is approximately three days (from August 23-25, inclusive). Each of the time periods is further divided into discrete time intervals, each of which is represented by one bar 414 of the bar graph 412. The bar graph 412 is bookmarked at its ends by bar graph scroll controls 418, which allow the user to scroll forward and backward in time along the bar graph 412.

To determine the bar graph 412, the server system 108 determines, for each of the time intervals, a likelihood that the person-of-interest 308 appears in the collection of surveillance video recordings for the time interval, and then represents that likelihood as the height of the bar 414 for that time interval. In this example embodiment, the server system 108 determines that likelihood as a maximum likelihood that the person-of-interest 308 appears in any one of the collection of surveillance video recordings for that time interval. In different embodiments, that likelihood may be determined differently. For example, in one different embodiment the server system 108 determines that likelihood as an average likelihood that the person-of-interest 308 appears in the image search results 406 that satisfy the match likelihood threshold.

As in FIG. 3, the page 300 of FIG. 4 also includes the timeline 320, video control buttons 322, and video time indicator 324 extending along the bottom of the page 300.

The application 144 permits the user to provide match confirmation user input regarding whether at least one of the image search results 406 depicts the person-of-interest 308. The user may provide the match confirmation user input by, for example, selecting one of the image search results 406 to bring up a context menu (not shown) allowing the user to confirm whether that search result 406 depicts the person-of-interest 308. In response to the match confirmation user input, the server system 108 in the depicted embodiment determines whether any match likelihoods change and, accordingly, whether positioning of the image search results 406 is to be changed in response to the match confirmation user input. For example, in one embodiment when the user confirms one of the results 406 is a match, the server system 108 may use that confirmed image as a reference for comparisons when performing one or both of face and body searches. When the positioning of the image search results is to be changed, the application 144 updates the positioning of the image search results 406 in response to the match confirmation user input. For example, the application 144 may delete from the image search results 406 any result the user indicates does not contain the person-of-interest 308 and rearrange the remaining results 406 accordingly.

When the match confirmation user input indicates that any one of the selected image results 406 depicts the person-of-interest 308, the application 144 displays a third indicator 410*c* over each of the selected image results 406 that the user confirms corresponds to the person-of-interest 308. As shown in the user interface page 300 of FIG. 5, which represents the page 300 of FIG. 4 after the user has provided match confirmation user input, the third indicator 410*c* in the depicted embodiment is a star and is identical the first and second indicators 410*a,b*. All three indicators 410*a-c* in FIG. 5 are in the three leftmost columns and the first row of the array of search results 406. In different embodiments (not depicted), any one or more of the first through third indicators 410*a-c* may be different from each other.

The page 300 of FIG. 5 also shows an appearance likelihood plot resizable selection window 502*a* and a timeline resizable selection window 502*b* overlaid on the bar graph 412 and the timeline 320, respectively. The user, by using the input device 114, is able to change the width of and pan each of the windows 502*a,b* by providing window resizing user input. The selection windows 502*a,b* may be synchronized such that resizing one of the windows 502*a,b* such that it covers a particular time span automatically causes the application 144 to resize the other of the windows 502*a,b* so that it also covers the same time span. Additionally, the application 144 selects the image search results 406 only from the collection of surveillance video recordings corresponding to the particular time span that the selection windows 502*a,b* cover. In this way, the user may reposition one of the selection windows 502*a,b* and automatically have the application 144 resize the other of the selection windows 502*a,b* and update the search results 406 accordingly.

Figure 6:
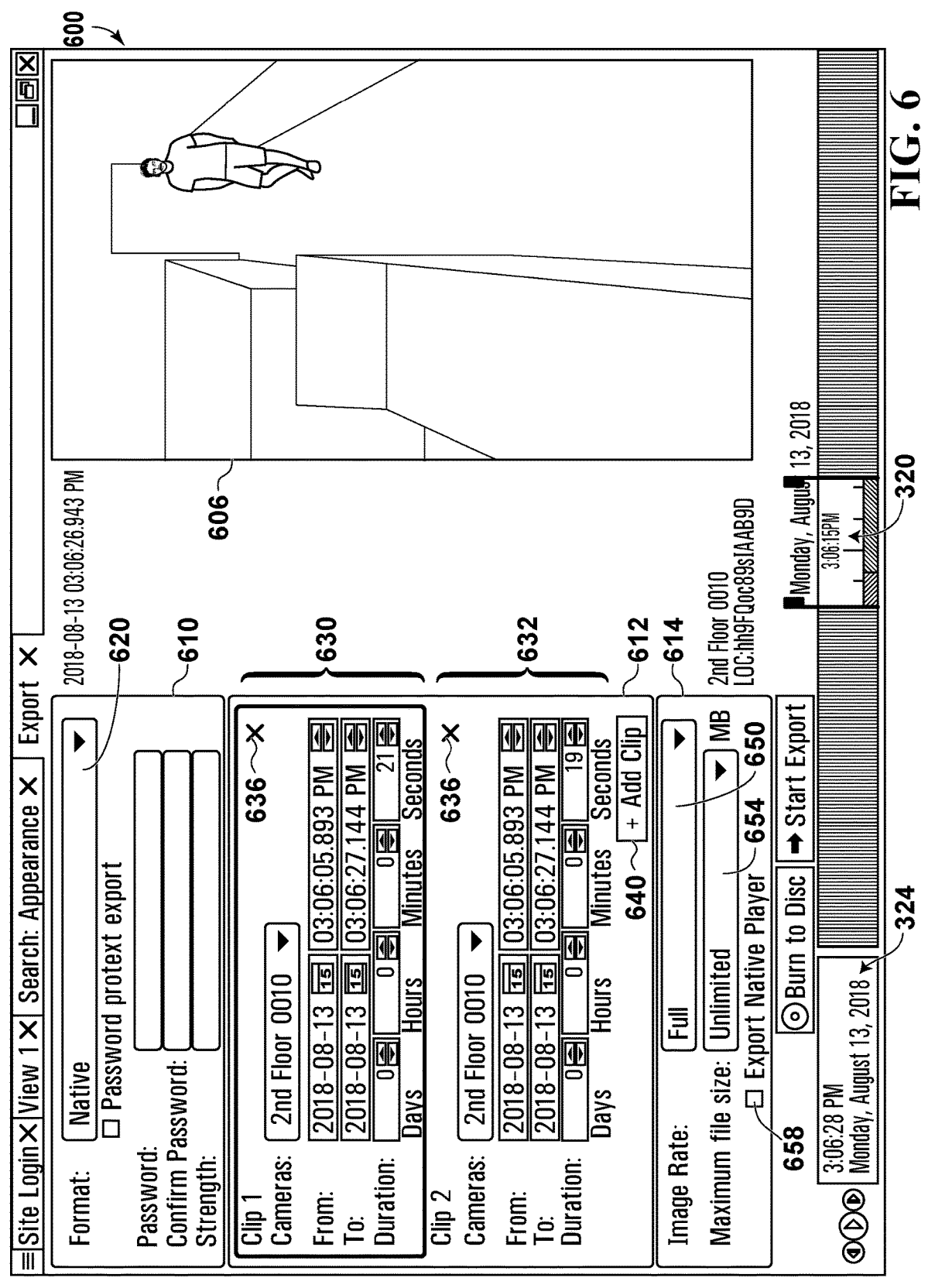

Referring now to FIG. 6, there is shown a user interface page 600 including an image frame 606 of a selected surveillance video recording clip. On the left hand side of the user interface page 600 are three widget groupings 610, 612 and 614. The widget grouping 610 is in the top, left hand corner of the user interface page 600 and includes a drop-down selector 620. The drop-down selector 620 allows the user to choose the multimedia format for export including, for example, native video, AVI video, JPEG images, etc.

Below the widget grouping 610 is the widget grouping 612 within which are two sub-groupings 630 and 632. Each of the sub-groupings 630 and 632 control content details of a respective surveillance video clip (the sub-grouping 630 controls content details of "Clip 1" and the sub-grouping 632 controls content details of "Clip 2"). Each of the sub-groupings 630 and 632 includes an "x" icon 636 which can be clicked on by the user to remove the respective surveillance video clip from amongst those surveillance video clips being collectively exported. Conversely there is also an "Add clip" icon 640 which can be used to add in one or more additional surveillance video clips amongst those to be collectively exported.

Below the widget grouping 612 is the widget grouping 614, which varies depending on the export format selection chosen via the drop-down selector 620 of the widget grouping 610. For example, when the drop-down selector 620 is set to "Native" as shown in FIG. 6, the widget grouping 614 includes a drop-down selector 650 to set a compression level, a drop-down selector 654 to set a file export size limit, and a check box 658 to indicate whether or not a player for the native file should be included with the export. As will be described in more detail later herein, changing the drop-down selector 620 from "Native" to "AVI video" changes the widget grouping 614 of the illustrated example embodiment to a new widget grouping that is different in both function and appearance. Also, although the example details described below relate to AVI export, it will be understood that example embodiments are not limited to AVI video export (other video formats are contemplated within the scope of alternatives to the illustrated example embodiment).

Figure 7:
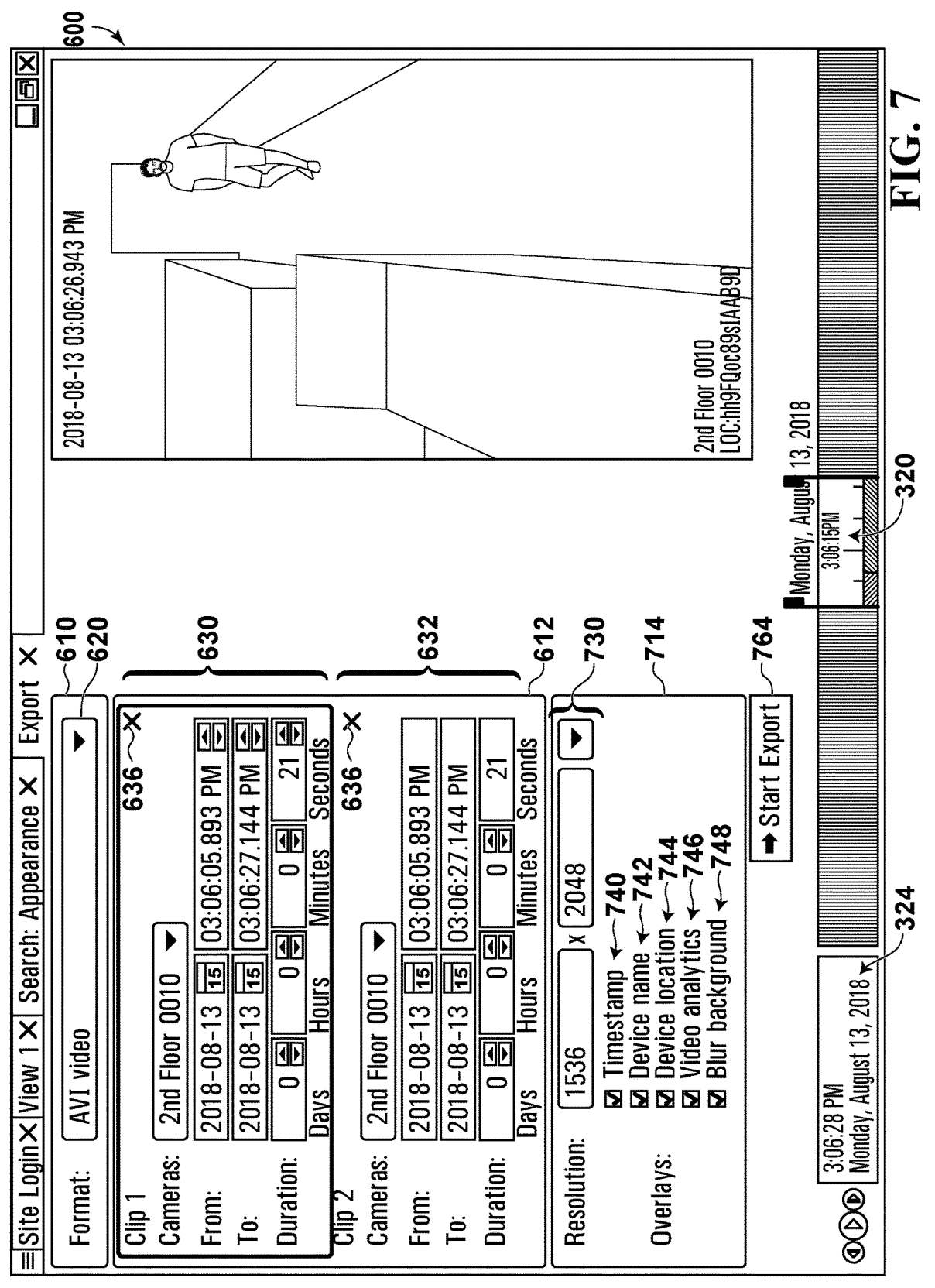

Reference will now be made to FIG. 7. As shown in this figure, the drop-down selector 620 has been changed from "Native" to "AVI video". This change causes a responsive change in one of the widget groupings within the user interface page 600. Specifically, the widget grouping 614 (FIG. 6) is changed into widget grouping 714 (FIG. 7). The widget grouping 714 includes a video resolution selector 730 and five check boxes 740, 742, 744, 746 and 748. The check box 740 can be changed between a checked state and an unchecked state to allow the user to selectively include or exclude a timestamp from the surveillance video being exported. The check box 742 can be changed between a checked state and an unchecked state to allow the user to selectively include or exclude a device name from the surveillance video being exported. The check box 744 can be changed between a checked state and an unchecked state to allow the user to selectively include or exclude a device location from the surveillance video being exported. The check box 746 can be changed between a checked state and an unchecked state to allow the user to selectively include or exclude video analytics activity (including, for example, bounding boxes) from the surveillance video being exported. The check box 748 allows the user to choose whether the surveillance video being exported should or should not be redacted in accordance with example embodiments herein described.

Once the user has finished inputting all of the desired characteristics for the surveillance video exports through interactions with the widget groupings 610, 612 and 714, the user can select "Start Export"' icon 764 (for example, the user can click on it) to begin the export process.

Figure 8:
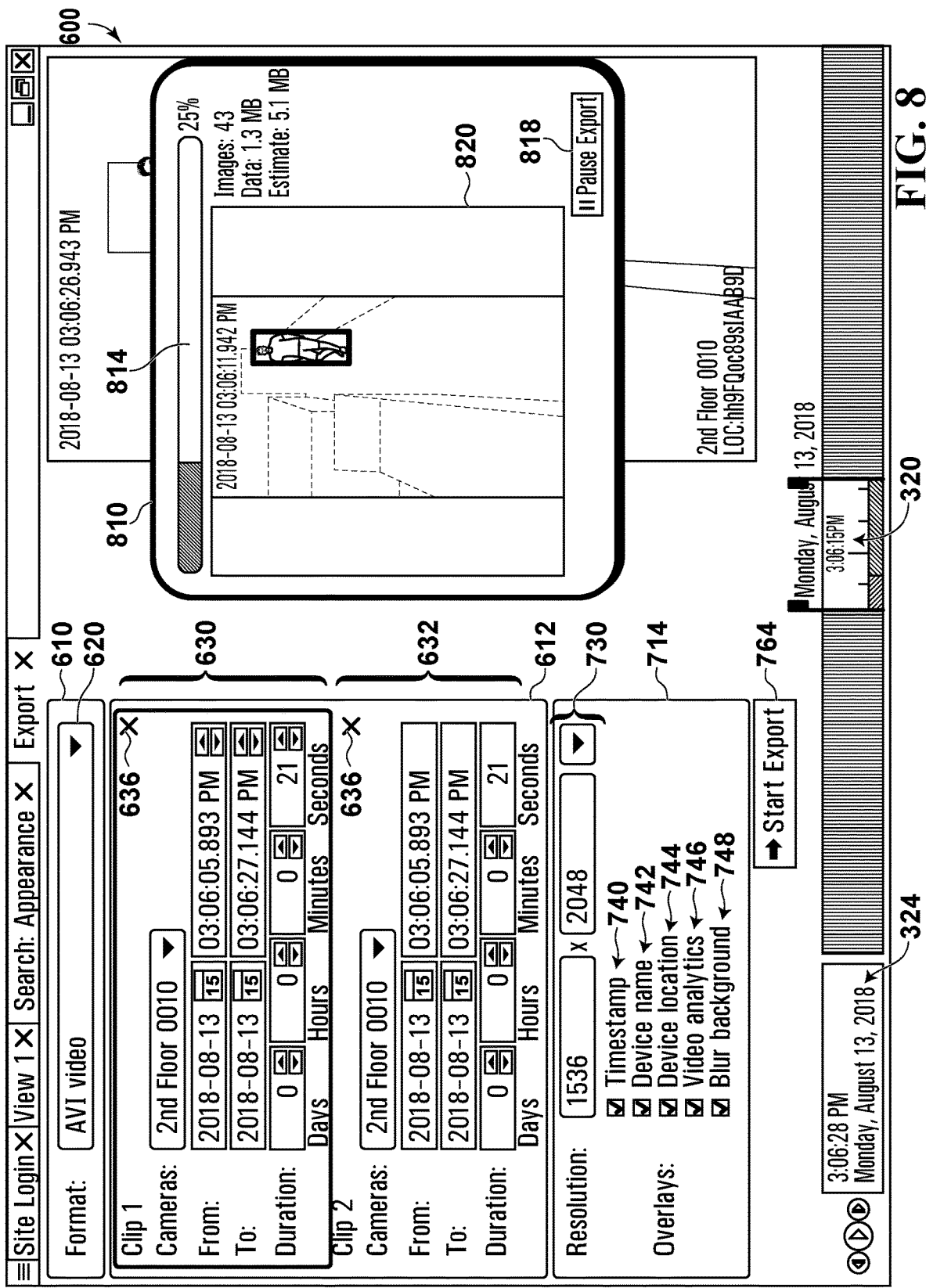
FIG. 8 shows the user interface page of FIG. 6 in a third state where 25% of the redacted video file generation is complete.

Reference will now be made to FIG. 8 which shows the state of the user interface page 600 after the user clicks on the "Start Export" icon 764. In particular, an export progress window 810 is presented in the foreground of the user interface page 600. Progress bar 814 within the window 810 gives a visual display of how far along the generation of the AVI video file has progressed. In the illustrated example, the solid bar is one quarter the length of the entire bar and "25%" (quantifying percentage completion as 25%) is displayed. An image frame 820 currently being processed as a part of the export process appears within the window 810 (i.e. the displayed image frame will change in accordance with the timeline of the recorded surveillance video as subsequent image frames after the current image frame are processed). Also within the window 810 is a "Pause Export" icon 818, which pauses the generation of the AVI video file if clicked on by the user.

Figure 9:
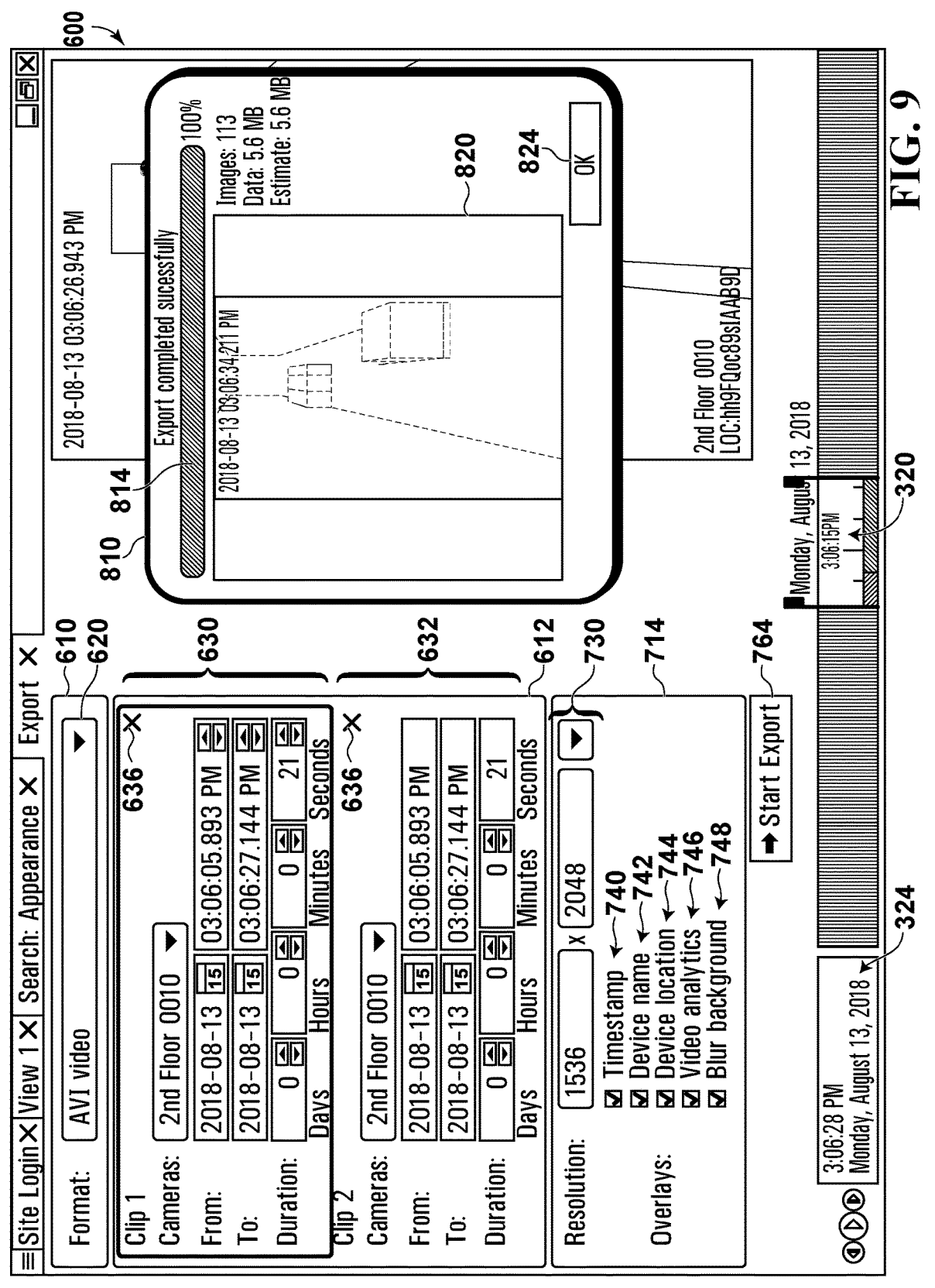

Referring now to FIG. 9, the illustrated user interface page 600 is similar to its state as illustrated in FIG. 8, except progress on the progress bar 814 within the window 810 has advanced from 25% to 100%. Also, "Export completed successfully" now appears as a notification message above the progress bar 814. Also, the "Pause Export" icon 818 shown in FIG. 8 is now replaced with an "OK" icon 824. A user may click on the icon 824 to close the window 810 and return other portions of the user interface page 600 to the foreground.

Figure 10:
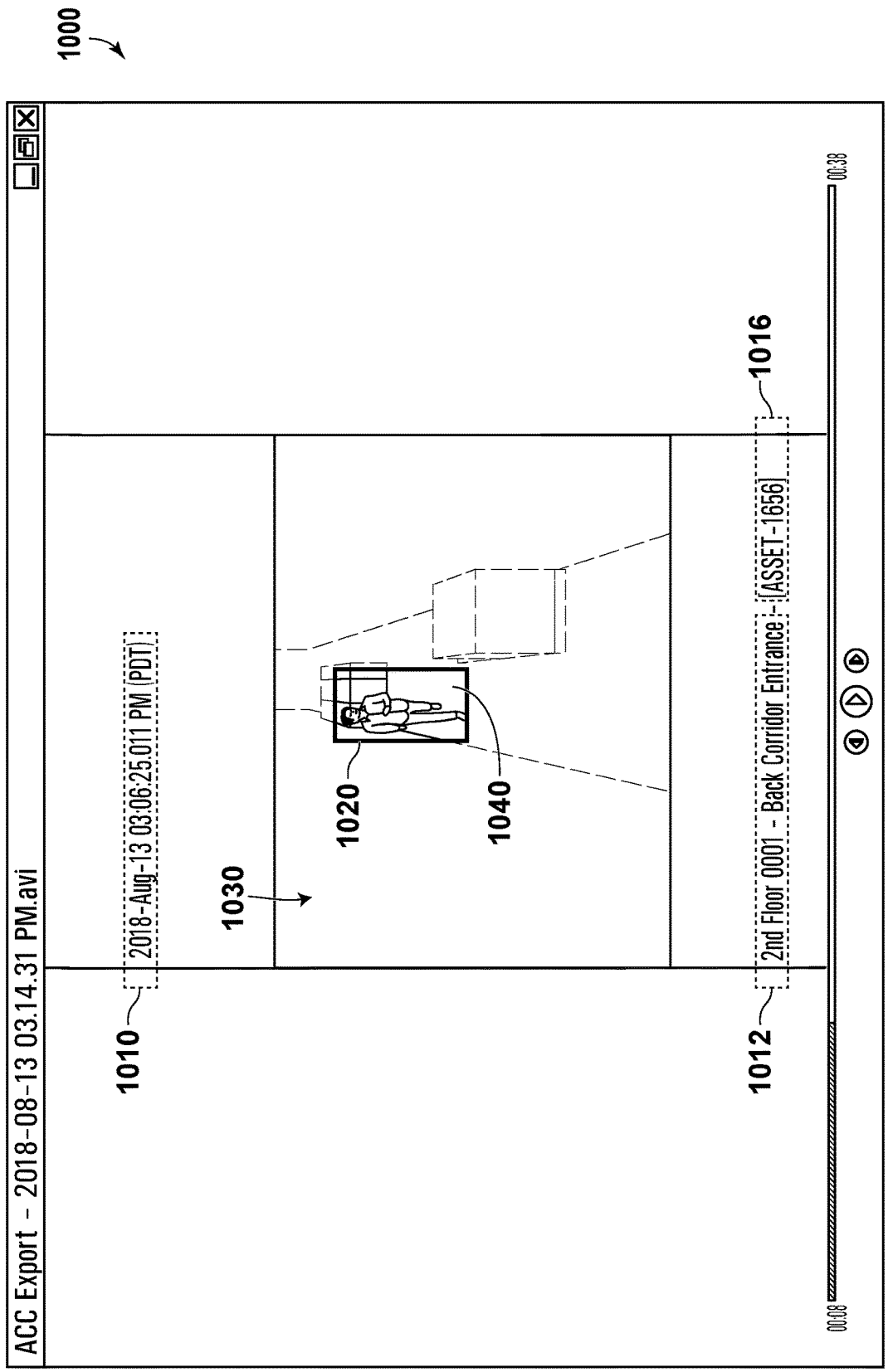
FIG. 10 shows a video player playing a redacted video file generated in accordance with an example embodiment.

After the redacted AVI video file has been generated, a person (for example, email or messaging recipient of the AVI video file) may wish to play the redacted surveillance video file. For example, the person possessing or otherwise having access to the redacted surveillance video file may open and play it within video player 1000 (FIG. 10).

In accordance with "Timestamp" check box 740 (FIG. 9) having been checked, a timestamp 1010 is displayed within the video player 1000 indicating the date and time a displayed image frame 1030 was captured.

In accordance with "Device location" check box 744 having been checked, a location stamp 1012 is displayed within the video player 1000 indicating location information concerning the camera that captured the displayed frame. Similarly in accordance with "Device name" check box 742 having been checked, a device stamp 1016 is displayed within the video player 1000 indicating a unique ID for a camera that captured the displayed frame.

Figure 11:
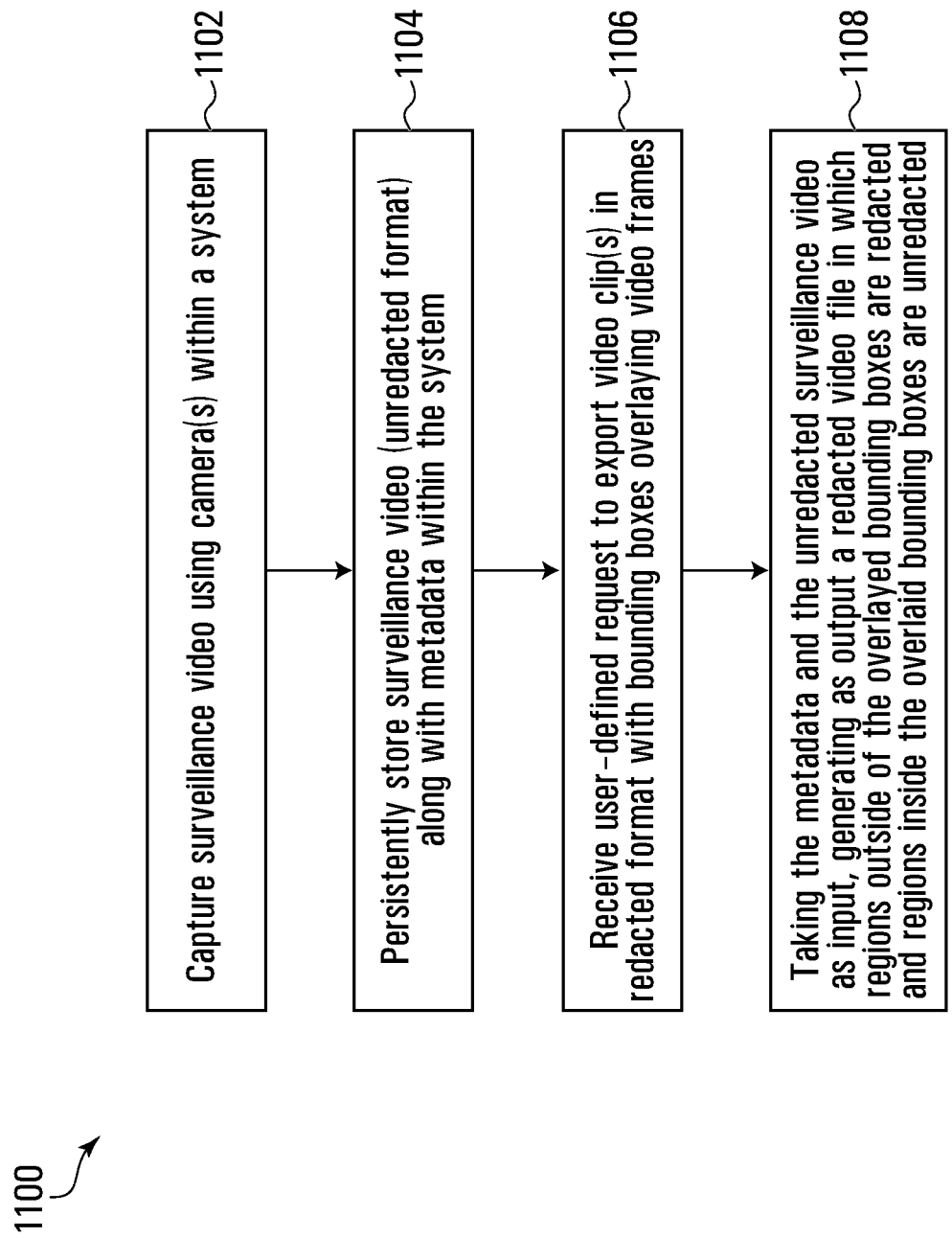
FIG. 11 is a flow chart illustrating a method for capturing, storing and redacting digital video in accordance with an example embodiment.

Reference will now be made to FIG. 11. FIG. 11 illustrates a method 1100 for capturing, storing and redacting digital video in accordance with an example embodiment.

The method 1100 includes capturing (1102) surveillance video using one or more of cameras such as, for example, one or more of the cameras 169 (FIG. 1) within the surveillance system 100.

Continuing along with ongoing reference to FIG. 11, the method 1100 also includes persistently storing (1104) both: i) the captured surveillance video in an unredacted format; and ii) the respective metadata for the surveillance video. More specifically, and as has already been previously described in connection with FIG. 1, digital surveillance video captured by the cameras 169 can be first transmitted (along with the associated metadata generated in these network edge devices) over at least one network to the server system 108, and then the digital surveillance video may thereafter be stored in the data store 190 within the server system 108.

Next the method 1100 includes receiving (1106) a user-defined request to export surveillance video clip(s) in a redacted format with bounding boxes overlaying image frames of the video. For example, as was previously described in connection with FIGS. 6-7, a user may interact with the widget groupings 610, 612 and 714 within the user interface page 600 to define a surveillance video clip(s) export request, including defining that the surveillance video clip(s) being exported will be generated in a redacted format with bounding boxes overlaying image frames of the surveillance video.

In terms of defining redaction, any part of image frames within any bounding box forming part of the exported file can be left unredacted. Alternatively, one or more characteristics of the objects within the bounding boxes may be employed as criteria to only leave certain objects unredacted. Alternatively, a single target and its respective bounding boxes can be chosen to be left redacted and everything else is redacted. In at least one example embodiment, the strictness of the redaction may depend inversely on the strictness in which the defined surveillance video clip(s) to be exported were selected out, on a time-filtering basis, from the original surveillance video (for instance, having regard to the selecting of objects-of-interest either causing a significant/non-trivial number of people whom were not intended to be included actually being included or by contrast only, as much as possible, what should have been left in was left in). For example, based on one or more of manual surveillance video review and automated same object-of-interest identification as herein disclosed, it is possible that, for example, all bounding boxes in the surveillance video to be exported may only contain the same object-of-interest. In such an instance the redaction can be less strict. In other instance the surveillance video to be exported may be footage of crowded areas which may warrant more strict criteria on redaction to satisfy privacy protection laws, regulations or policies.

A special case arises when the video to be exported includes at least two objects which cross paths and their respective bounding boxes become close enough such that an intersection occurs (as will be understood by one skilled in the art, this intersection can be detected by, for example, a CNN of the video analytics system). When this occurs, two options for redaction of the intersection inside the bounding box boundaries are as follows: i) leave everything in relation to the intersecting objects unredacted; or ii) leave everything in relation to the intersecting objects redacted.

Still with reference to FIG. 11, the method 1100 also includes generating (1108), using the metadata and the unredacted surveillance video as input, a redacted surveillance video file (output of the generation) in which regions outside of the overlaid bounding boxes are redacted whereas regions inside of the overlaid bounding boxes are left unredacted. For example, previously described FIGS. 8-9 illustrate generation of a redacted AVI video file based on user-defined "Clip 1" and "Clip 2". The exact visual appearance of the redaction will vary as between different example embodiments. For example, in one example embodiment the blur may make pixels appear as though one is looking at that part of the scene through frosted glass. Alternatively, in a different example embodiment the blur may make the redacted part of the scene take on a distorted appearance so that nothing redacted can be recognized. Also, redaction selection need not necessarily be limited to selection of a single strength of redaction. In accordance with at least one example embodiment a user is able to select (by way of, for instance, user input provided via a modified version of the user interface shown in FIG. 7) a strength level of the redaction (for example, expressed as some percentage, greater than 0% but less than or equal to 100%, of full strength redaction).

In accordance with at least some example embodiment, redacting surveillance video as herein disclosed may facilitate privacy protection in relation to sharing surveillance video footage that has been captured by a video surveillance system including, for instance, sharing surveillance video footage with entities that are not authorized users of the system. Examples of such entities may include law enforcement, lawyers/paralegals, media/publications, etc. In such situations, it is possible that individuals could be inadvertently identified in the resulting footage even if they were not relevant to the subject of interest. With increasing privacy concerns and evolving laws and regulations to address those concerns, methods and systems for redacting surveillance video are expected to become increasingly important.

Figure 12:
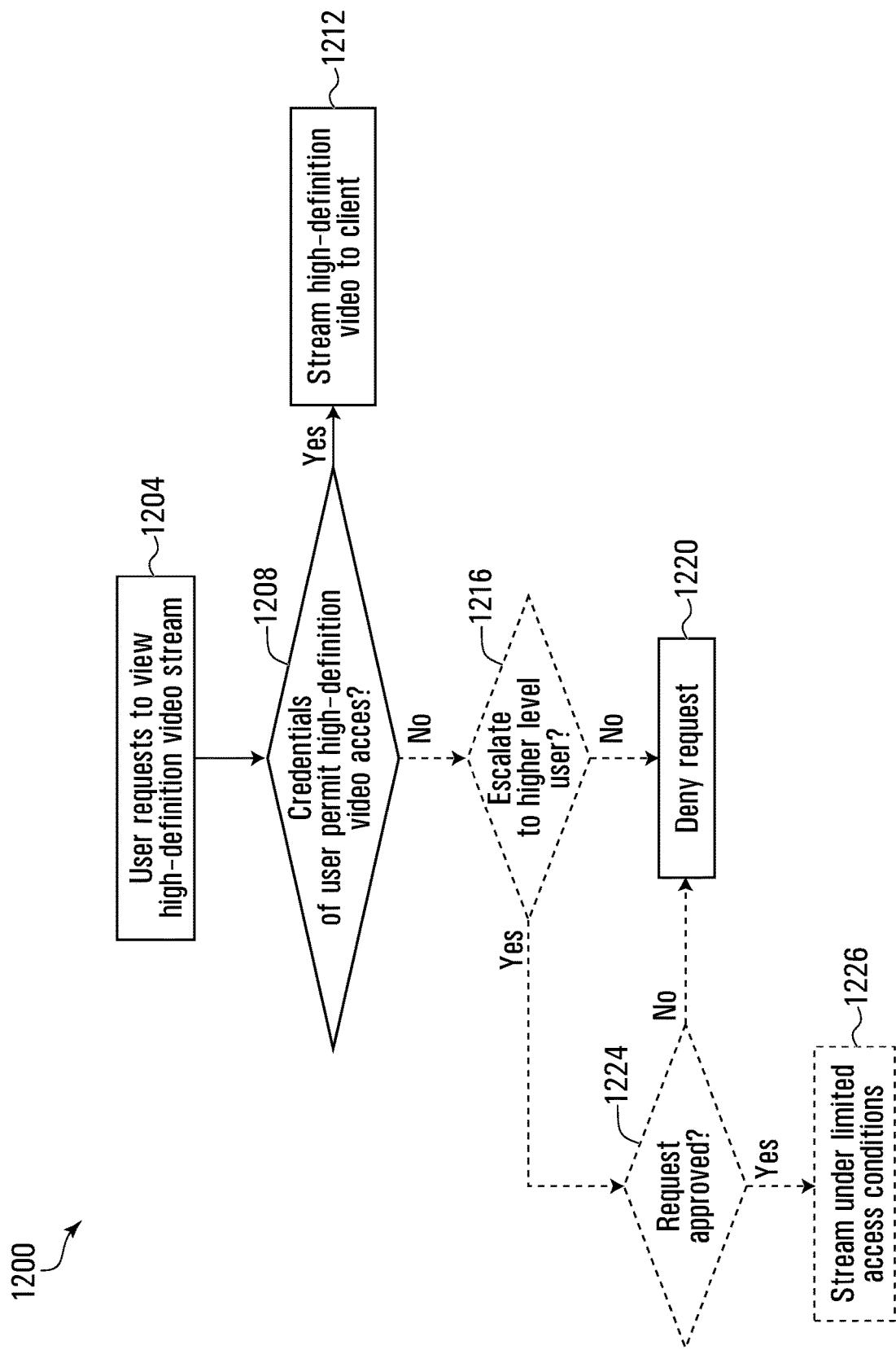
FIG. 12 is a flow chart illustrating a method for selectively permitting or denying a user from accessing or viewing high-definition video in accordance with an example embodiment.

Reference will now be made to FIG. 12. FIG. 12 illustrates a method 1200 for selectively permitting or denying a user of a VMS from accessing and viewing high definition surveillance video based on the credentials of the user existing and defined within the surveillance system 100. Actions shown in dashed lines represent optional actions. For example, in one example embodiment where action 1216 is omitted, action 1220 follows the "NO" branch from decision action 1208 instead of following the action 1216.

The method 1200 includes a user requesting (1204) to view a high-definition surveillance video stream (for example, on the display 126 of the surveillance system 100 illustrated in FIG. 1). In at least one example, a request is transmitted from the computer terminal 104 to the server system 108 for recorded surveillance video stored on the storage 190. In at least one alternative example, a request is transmitted from the computer terminal 104 to the server system 108 for live surveillance video from at least one of the cameras 169.

As a part of processing the user request, the method 1200 also includes verifying (1208) whether or not the credentials of the user permit the user to be able to view high-definition surveillance video (as previously explained, credentials verification may be controlled by the credential manager 175 in the server system 108 shown in FIG. 1). If yes, high-definition surveillance video is streamed (1212) to the client. If no, the decision action 1216 follows. The decision action 1216 relates to whether or not the VMS is set to allow the user to escalate his request to a high level user (for example, if the user is a security guard working a shift within a building, the higher level user could be the supervisor of that security guard).

If the VMS is not set to allow the user to escalate his request to a high level user, the request is denied (1220). If the VMS is set to allow the user to escalate his request to a high level user, decision action 1224 follows in which the higher level user either approves or refuses the request. If the request is approved, streaming of the surveillance video (1226) under limited access conditions follows. If the request is not approved, the request is denied (1220).

Certain adaptations and modifications of the described embodiments can be made. For example, with respect to the client-side video review application 144 (FIGS. 1 and 2), this has been herein described as software installed on the client terminal 104 (e.g. packaged software); however in some alternative example embodiments implementation of the UI can be achieved with less installed software through the use of a web browser application (e.g. one of the other applications 152 shown in FIG. 1). A web browser application is a program used to view, download, upload, surf, and/or otherwise access documents (for example, web pages). In some examples, the browser application may be the well-known Microsoft® Internet Explorer®. Of course other types of browser applications are also equally possible including, for example, Google® Chrome™. The browser application reads pages that are marked up (for example, in HTML). Also, the browser application interprets the marked up pages into what the user sees rendered as a web page. The browser application could be run on the computer terminal 104 to cooperate with software components on the server system 108 in order to enable a computer terminal user to carry out actions related to providing input in order to, for example, facilitate identifying same individuals or objects appearing in a plurality of different surveillance video recordings. In such circumstances, the user of the computer terminal 104 is provided with an alternative example user interface through which the user inputs and receives information in relation to the surveillance video recordings.

Although example embodiments have described a reference image for a search as being taken from an image within recorded surveillance video, in some example embodiments it may be possible to conduct a search based on a scanned photograph or still image taken by a digital camera. This may be particularly true where the photo or other image is, for example, taken recent enough such that the clothing and appearance is likely to be the same as what may be found in the surveillance video recordings.

Therefore, the above discussed embodiments are considered to be illustrative and not restrictive, and the invention should be construed as limited only by the appended claims.

The invention claimed is:

1. A method comprising:
   persistently storing surveillance video in an unredacted format within a system;
   accessing, from within the system, the surveillance video and metadata defining a plurality of moving bounding boxes that:
      designate a respective plurality of identified foreground objects within the surveillance video; and
      follow movement thereof; and
   generating, from the surveillance video, at least one redacted video clip formatted to include at least a subset of the moving bounding boxes, the subset of the moving bounding boxes overlaying video image frames of the redacted video clip, each bounding box of the subset delineating a boundary inside of which a revealed object area and outside of which an outside area appear in the redacted video clip as an unredacted part and a redacted part respectively.

2. The method of claim 1 wherein the moving bounding boxes are rectangular in shape.

3. The method of claim 2 wherein dimensions of each of the moving bounding boxes vary as a function of time.

4. The method of claim 1 further comprising transmitting the redacted video clip over at least one network from a first computing device to a second computing device.

5. The method of claim 4 wherein the second computing device is a mobile device.

6. The method of claim 1 wherein at least one of the identified foreground objects has visibly identifiable human traits.

7. The method of claim 6 wherein the visibly identifiable human traits include at least one of a physical appearance and a facial features.

8. The method of claim 1 wherein at least one of the identified foreground objects has visibly identifiable non-human traits.

9. The method of claim 8 wherein the visibly identifiable non-human traits include characters on a license plate.

10. The method of claim 1 wherein at least one of the identified foreground objects is a human face.

11. Apparatus comprising:
    a display;
    an input device;
    at least one processor communicatively coupled to the display and the input device; and
    a memory communicatively coupled to the processor and having stored thereon computer program code that is executable by the processor, wherein the computer program code, when executed by the processor, causes the processor to perform a method comprising:
       retrieving, via a request to a server, surveillance video and metadata defining a plurality of moving bounding boxes that:
          designate a respective plurality of identified foreground objects within the surveillance video; and
          follow movement thereof; and
       generating, from the surveillance video, at least one redacted video clip formatted to include at least a subset of the moving bounding boxes, the subset of the moving bounding boxes overlaying video image frames of the redacted video clip, each bounding box of the subset delineating a boundary inside of which a revealed object area and outside of which an outside area appear in the redacted video clip as an unredacted part and a redacted part respectively.

12. The apparatus of claim 11 wherein the moving bounding boxes are rectangular in shape.

13. The apparatus of claim 12 wherein dimensions of each of the moving bounding boxes vary as a function of time.

14. The apparatus of claim 11 wherein at east one of the identified foreground objects has visibly identifiable human traits.

15. The apparatus of claim 14 wherein the visibly identifiable human traits include at least one of a physical appearance and a facial features.

16. The apparatus of claim 11 wherein at least one of the identified foreground objects has visibly identifiable non-human traits.

17. The apparatus of claim 16 wherein the visibly identifiable non-human traits include characters on a license plate.

18. The apparatus of claim 11 wherein at least one of the identified foreground objects is a human face.

19. The apparatus of claim 11 wherein the apparatus is a computer terminal.

20. A tangible, non-transitory, computer-readable storage medium having instructions encoded therein, wherein the instructions, when executed by at least one processor, causes a carrying out of a method comprising:
    retrieving, via a request to a server, surveillance video and metadata defining a plurality of moving bounding boxes that:
       designate a respective plurality of identified foreground objects within the surveillance video; and
       follow movement thereof; and
    generating, from the surveillance video, at least one redacted video clip formatted to include at least a subset of the moving bounding boxes; the subset of the moving bounding boxes overlaying video image frames of the redacted video dip, each bounding box of the subset delineating a boundary inside of which a revealed object area and outside of which an outside area appear in the redacted video clip as an unredacted part and a redacted part respectively.

* * * * *